United States Patent
Hasson et al.

(10) Patent No.: US 6,184,981 B1
(45) Date of Patent: *Feb. 6, 2001

(54) SPECKLE MITIGATION FOR COHERENT DETECTION EMPLOYING A WIDE BAND SIGNAL

(75) Inventors: Victor H. Hasson, Winchester, MA (US); Mark A. Kovacs, Windham, NH (US)

(73) Assignee: Textron Systems Corporation, Wilmington, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/277,003

(22) Filed: Mar. 26, 1999

Related U.S. Application Data
(60) Provisional application No. 60/094,461, filed on Jul. 28, 1998.

(51) Int. Cl.[7] ......................................... G01J 3/40
(52) U.S. Cl. ..................... 356/303; 356/300; 356/336; 356/338; 356/337
(58) Field of Search .................... 356/303, 300, 356/336, 337, 338, 445

(56) References Cited

U.S. PATENT DOCUMENTS

| | | | |
|---|---|---|---|
| 3,819,920 | * 6/1974 | Goldfischer | 235/152 |
| 3,973,852 | 8/1976 | Moore et al. | 356/207 |
| 4,176,959 | 12/1979 | Keene et al. | 356/325 |
| 4,450,356 | 5/1984 | Murray et al. | 250/339 |
| 4,475,816 | 10/1984 | Mooradian et al. | 356/437 |
| 4,496,839 | 1/1985 | Bernstein et al. | 250/341 |
| 4,648,276 | * 3/1987 | Klepper et al. | 73/599 |
| 4,934,816 | 6/1990 | Silver et al. | 356/409 |
| 5,015,099 | 5/1991 | Nagai et al. | 356/437 |
| 5,026,991 | 6/1991 | Goldstein et al. | 250/343 |
| 5,241,315 | 8/1993 | Spinhirne | 342/54 |
| 5,252,060 | 10/1993 | McKinnon et al. | 431/12 |

* cited by examiner

Primary Examiner—Frank G. Font
Assistant Examiner—Reginald A. Ratliff
(74) Attorney, Agent, or Firm—Hamilton, Brook, Smith & Reynolds, P.C.

(57) ABSTRACT

Multiple independent spectral measurements of light reflected from a target are produced concurrently by illuminating the target with a train of laser pulses wherein the train of pulses produces a line spectrum within the illuminating signal. A characteristic dimension of the receiving aperture is established based on illuminating wavelength, a cross-sectional dimension of illuminated region of a target, and the range between a target and the receiving aperture or image plane. The characteristic dimension corresponds to the spacing of peaks in a speckle pattern of an image plane. The use of multiple receiving telescopes having the characteristic dimension allows for independent measurements concurrently by each of the receiving telescopes. The train of illuminating pulses is generated by mode-locked operation of the laser for synchronization of sinusoidal components at line frequencies of the pulse train spectrum, and wherein the spacing of the spectral lines is at least a decorrelation frequency. The number of spectral lines preferably equals the number of independent measurements concurrently attainable during reception of the reflected pulse train. Alternatively, the laser frequency may be linearly swept such that the overall bandwidth is equal to the bandwidth encompassed by the line spectrum of the generated pulse.

6 Claims, 6 Drawing Sheets

SPECKLE MITIGATION FOR COHERENT DETECTION EMPLOYING A WIDE BAND SIGNAL

RELATED APPLICATIONS

This application claims priority to U.S. Provisional Application No. 60/094,461, filed Jul. 28, 1998, the entire teachings of which are incorporated herein by reference.

BACKGROUND OF THE INVENTION

This invention relates to measurement of spectral characteristics by transmission of a coherent beam of radiation, such as infrared light, to measure atmospheric properties.

Lasers are ideally suited for making a class of long range measurements involving the transmission of an optical beam from a source to a distant target, the scattering of the illuminating radiation from the target, and the detection of the scattered energy by a receiver (or multiple receivers coincident with or in the vicinity of the transmitter. Information is obtained by measuring the return signal strength and other parameters, such as the round-trip travel time, Doppler shift of the returned radiation, and polarization changes. The information includes target properties (size, distance, velocity, and range-resolved rotational velocity) as well as properties of the medium through which the optical beam is traveling to and from the target. Information pertaining to the target may be grouped under the general category of laser radar (ladar) while the measurements pertaining to the optical medium are generally grouped under remote sensing (lidar).

For example, with a ground-based source and airborne target, measurement of signal strength yields information about a target's physical properties. Measurement of the round-trip travel time to and from the target provides the target's range measurement. Determination of the frequency shift of the return radiation provides a direct measure of the target's velocity relative to the source. This is the basis for an optical radar system.

If the illuminating source is airborne and the target is the ground, one may also infer the presence of absorbing atmospheric species along the optical path at the transmitted wavelength by measuring the strength of the back-scattered signal. This is the essential technique for remote sensing of chemical species, such as airborne pollutants. This can be achieved by standard path-integrated or range-resolved differential absorption measurements using pulsed laser sources. Path-integrated systems rely on topographical returns of an echo signal, while range-resolved sensors use aerosol back-scattering.

A pollutant can be identified, for example, from its spectrally resolved absorption signature. The absorption measurements are generally performed in the infrared atmospheric windows (3–5 microns and 8–12 micron wavelength) although the techniques described below will provide equivalent benefit in the visible and near infrared region (0.4→2.0 micron wavelength). The measurements can be conducted using standard direct detection or, in the infrared region, much more sensitive, coherent (heterodyne) detection.

The utility of these lidar and ladar measurements depends upon the capability to operate at long range. At a given range, the signal-to-noise ratio determines overall system parameters such as target size, reflectivity and surface quality and the system's transmitted energy, transmitter and receiver aperture sizes, and detection sensitivity.

One strives to achieve single photon detection sensitivity to optimize system performance. In the visible and near-infrared regions where thermal-noise sources produce little competing signal, direct detection, which depends upon the return signal energy or power and is proportional to the square of the return electric field amplitude, affords single photon detection capability. In the longer wavelength, infrared region, where thermal radiation-induced noise can mask the return signal strength, coherent detection, which depends upon the amplitude of the return signal electric field and requires an additional optical source to serve as a local oscillator, delivers single photon detection capability. Although spectral operating range, hardware complexity and desired sensitivity dictate the detection mode, both methods take advantage of the laser beam's high brightness and directionality which is a result of the laser's beam spatial coherence.

Temporal coherence causes a problem for both detection modes by producing a speckled pattern in the receiver plane as a result of interference among electric field contributions scattered from a rough (diffuse) target surface. The surface may provide specular or diffuse reflection of the illuminating radiation depending upon the scale size of the surface roughness. When the scale size for surface irregularities is small compared to the illuminating wavelength, the return is specular. For surface roughness scale sizes comparable to or larger than the illuminating wavelength, the scattering is diffuse and speckle is produced.

Speckle degrades system performance by adding a random, pulse-to-pulse fluctuation to the return signal electric field. The fluctuation is a result of small changes in the optical path length (comparable to the wavelength of the illuminating radiation). Such changes in the optical path length may be produced by target or source motion, or by atmospheric fluctuations appearing within the optical transmission path between successive pulses of the laser radiation. The pulse-to-pulse speckle generated fluctuations increases the variance in the return signal measurement which serves to decrease the effective signal-to-noise ratio and, thereby, decrease the measurement precision.

For direct detection systems which measure the square of the return signal electric field and are insensitive to its phase, speckle can be accommodated (and the resulting variance reduced) by increasing the receiver aperture to collect a number of speckles simultaneously. The resulting detector output represents an average over the individual speckle intensities and more closely represents the mean power scattered from the target. This technique, however, is not applicable to coherent detection since the output signal depends upon the electric amplitude and phase. Well known analyses have shown that the variance in the coherently detected signal does not diminish as the aperture size decreases. In the past, the lack of an effective means of speckle-induced variance reduction have discouraged the use of coherent detection and have made unavailable its significantly greater sensitivity in the infrared region as compared to direct detection.

Systems employing coherent illumination and either direct or coherent detection methods can offer the possibility of achieving the long ranges which are desirable in many surveillance type functions providing that the aforementioned interference due to speckle can be overcome. The invention below provides a method to reduce the speckle-induced fluctuations for both detection modes.

SUMMARY OF THE INVENTION

In accordance with the present invention, reduced variance is provided in the spectral measurement of airborne substances, such as pollutants, by use of laser illumination, either in a ladar or lidar system. Mitigation of such variance, or so-called speckle interference, is obtained by concurrent independent measurements of spectral characteristics combined with an averaging of the independent measurements to reduce the random-speckle induced perturbations of return signal amplitudes. The concurrent independent measurements can be obtained either by use of multiple receiving apertures and/or by transmission of a laser signal having multiple carrier spectral lines so far apart that each carrier component of the laser signal permits performance of a measurement independent of measurements performed by laser signals at other carrier frequencies.

With respect to the utilization of multiple receiving apertures, consideration is given to the speckle pattern in a plane of the receiving apertures resulting from illumination of the target with coherent radiation. The effect of the speckle is to introduce variations in amplitude of the received signal as one progresses across the receiving plane. The variations may be described as being quasi periodic with peaks and approximate nulls in the receiving pattern due to constructive and destructive interference in the speckled return signal. The spacing between the peaks may be described in terms of a characteristic dimension of received signal which, in the case of monostatic radar, is equal to diameter of a circular transmission aperture employed for transmission of the laser signal. Thus, by limiting a diameter of a receiving aperture to the characteristic dimension, the signal received by the aperture is constrained to be a region of constructive interference for maximum signal response. Furthermore, in order to insure independence of measurement, the receiving apertures are spaced apart, on centers of the receiving apertures by spacings equal to an integral number of the characteristic dimension. Thereby, an array of receiving apertures can be constructed wherein the respective receiving apertures are operative in the conduction of independent measurements of the spectral characteristics of the environment through which the laser beam propagates.

With respect to the concurrent independent measurements made with a train of pulses of the transmitted laser signal, a mode-locked laser is used to produce a comb spectrum wherein the bandwidth of the spectral components of the transmitted pulse, and the spacing of individual components of the spectrum is related to the repetition frequency of the pulse train. The spectral parameters are adjusted by appropriate selection of the length of the laser resonator. This spectrum is centered on a nominal value of carrier frequency of radiation (typically infrared radiation) radiated by the laser. This provides the pulse train as a set of sinusoidal components at line frequencies wherein the sinusoidal components are synchronized, as distinguished from randomly occurring, and wherein the spacing of the spectral lines is large enough to provide for a decorrelation of the speckled patterns produced by each of the sinusoidal components.

The number of wavelengths of each of the respective spectral components is an integral number of wavelengths in the round-trip propagation path within the resonant chamber of the laser. Thereby, by decreasing the length of the resonant chamber, the fractional increment of frequency difference between spectral components increases, while an increase in the round-trip path of the resonant chamber results in a decrease of the fractional increment in frequency difference between the successive frequency lines of the transmitted spectrum. Independence of measurement is obtained by providing a sufficiently large frequency difference among the various spectral lines such that concurrent components of the transmitted signal at the various portions of the spectrum produce component return signals which are decorrelated from each other. The magnitude of the frequency difference between adjacent spectral lines to achieve decorrelation depends upon the target geometry as discussed below.

In the case of a laser beam directed downwardly towards the ground at an elevation angle in the range of 5–10 degrees, typically 7–8 degrees, the train of the pulses of radiation is seen to progress along the target area. In the case of a beam of circular cross section, the low elevation angle produces an elliptical shape to a footprint of the beam on the ground, and the pulses of radiation propagate along this footprint. Here too, there is an interference pattern having both constructive and destructive interference resulting in a series of maxima and minima in the amplitude of the return signal. The dimension of the elliptical footprint (major axis) determines the required frequency difference. A sufficient jump in frequency from one sinusoidal component to a second sinusoidal component provides a difference in phase accumulation over the illuminated region, between the sinusoidal components, enabling the return signals of the various sinusoidal components to be decorrelated. The requisite frequency shift is referred to as the decorrelation frequency shift.

The resonant chamber of the laser is selected to provide for the requisite difference frequency among the laser components of the outputted laser signal to achieve decorrelation. Thereby, the return signal provides the set of concurrent independent measurements at respective values of the frequency components. This provides the requisite multiplicity of independent measurements of the spectral characteristics of the environment through which the laser beam propagates. In order to extract the independent measurements from the return signal, a Fourier transform of the signal is provided at the time of the transmission of the signal and also at the time of reception of the return signal. The first Fourier transform is employed as a reference spectrum, and the second Fourier transform is employed to correlate the spectrum of the received signal against the spectrum of the transmitted signal. The result of the Fourier transformation and correlation is to provide a comparison of the transmitted and the received power in various spectral lines of the return signal. This provides the desired data of the environment through which the laser beam propagates.

The foregoing data processing procedure may be repeated for each of the receiving apertures, in the case wherein an array of receiving apertures is employed, to provide for averaging of the independent measurements. Thus, there are two modes of attainment of an averaging effect, namely, the composite measurements from the comb spectrum and the averaging of the measurements from the various receiving apertures. The result is a highly precise measurement of the spectral properties of the environment accomplished with far greater rapidity than has been possible heretofore.

BRIEF DESCRIPTION OF THE DRAWINGS

The aforementioned aspects and other features of the invention are explained in the following description, taken in connection with the accompanying drawing figures wherein.

Identically labeled elements appearing in different ones of the figures refer to the same elements in the different figures but may not be referenced in the description for all figures.

DETAILED DESCRIPTION OF THE INVENTION

Figure 1:
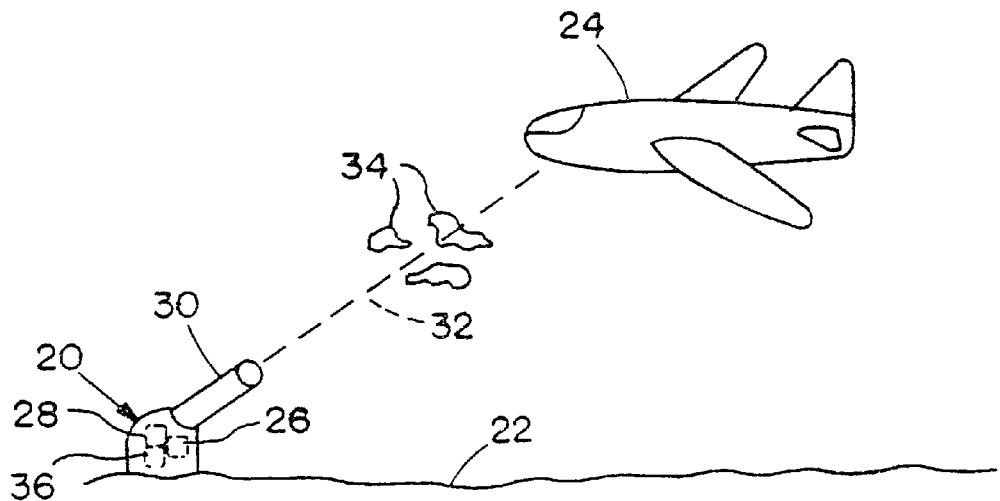
FIG. 1 shows a stylized view of a laser system located on the ground and transmitting a beam of radiation upwards to a target in the form of an aircraft.

FIG. 1 shows a laser system 20 located on the ground 22 for transmission of an optical signal to an aircraft 24, the system 20 including a transmitter 26 for generating an outgoing optical signal, a receiver 28 for sensing an optical signal reflected from the aircraft 24, and a telescope 30. The optical signal is a sequence of pulses of radiation. The telescope 30 is employed with the transmitter 26 for focusing the outgoing signal to provide a beam 32 which propagates through the atmosphere to the aircraft 24, and serves also to gather radiant energy of the reflected signal for operation of the receiver 28. The received signal has the characteristics of the transmitted signal, but is modified from the transmitter signal by the aircraft physical properties and its motion 24 and by pollutants 34 found in the atmosphere. Such modification in the received signal may include a Doppler frequency shift and selective attenuation of various spectral components. Detection and analysis of such modifications is provided by a signal processor 36 connected to the receiver 28.

Figure 2:
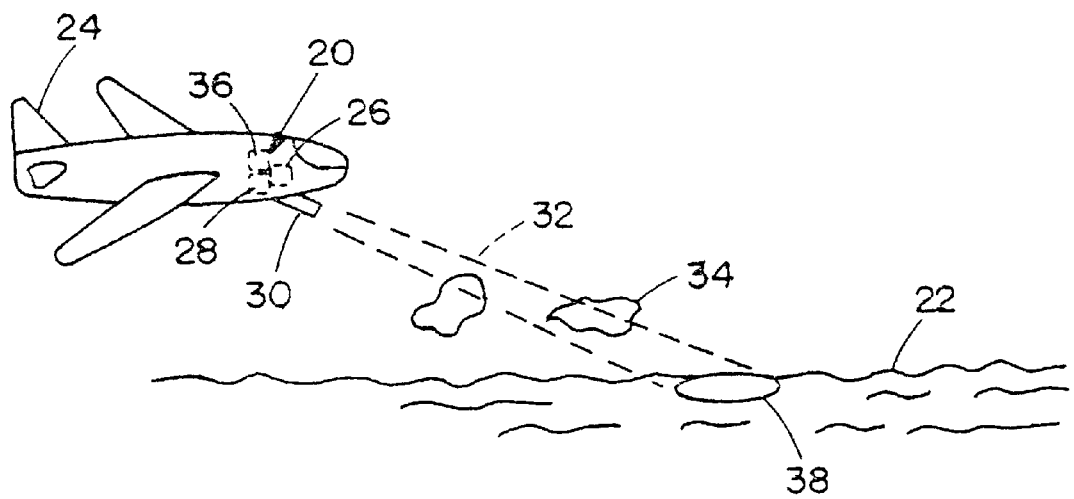
FIG. 2 shows a stylized view of a laser system located on an aircraft and transmitting a beam of radiation downwards to a target represented as a portion of the surface of the earth.

FIG. 2 shows an arrangement for measurement by means of transmitted and reflected optical energy, the arrangement being the reverse of that shown in FIG. 1. In FIG. 2, the laser system 20 is carried by the aircraft 24, and directs the beam 32 of radiation downwards towards the ground 22. The outgoing signal is transmitted by the transmitter 26 and via the telescope 30 which forms the beam 32. The beam 32 illuminates a portion of the ground 22 designated as a footprint 38. The ground 22 has sufficient roughness to reflect the radiation over a large region of space included a reflection of rays back towards the telescope 30. The roughness of the surface of the earth 22 is constituted by perturbations, or irregularities, in the surface of the earth 22, the magnitude of an individual one of the perturbations being on the order of a wavelength of the illuminating radiation. The radiation transmitted by the laser system 20 is coherent radiation produced by a mode locking of a laser as will be described hereinafter in greater detail. As a result of the coherence of the radiation, there is interference among the waves reflected from the numerous perturbations throughout the footprint 38, this interference giving rise to the phenomenon known as speckle.

Figure 3:
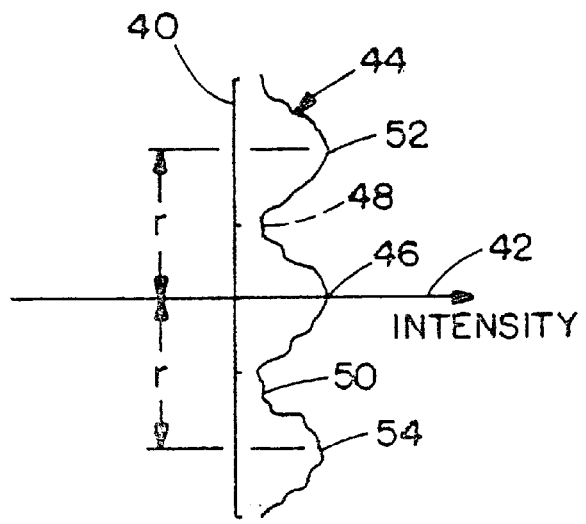
FIG. 3 is a graph showing variations in intensity of a signal reflected from the target of FIG. 2 and received in a speckled pattern at the laser system.

FIG. 3 is a graph showing the effect of speckle wherein there is constructive and destructive interference observed in an image plane 40 at the foregoing receiver 38. FIG. 3 is a probability distribution governing the speckle pattern of received radiation intensity. The image plane 40 is represented by a vertical line. An axis 42 of the foregoing telescope 30 is represented by a horizontal line intersecting the image plane 40. The vertical line of the image plane 40 also serves to measure distance off of boresight of the telescope 30, and the horizontal line, axis 42, also serves as a measure of intensity of radiation received at the image plane 40. A trace 44 shows the intensity of the received radiation in the image plane 40 as a function of distance from the axis 42. The graph shows that a peak value 46 of intensity is received at the axis 42. The intensity falls off with increasing distance on both sides of the axis 42. Still further peaks, not shown, are present with further distance from the axis 42. The three peaks 46, 52, and 54 have approximately the same width along the image plane 40.

Figure 5:
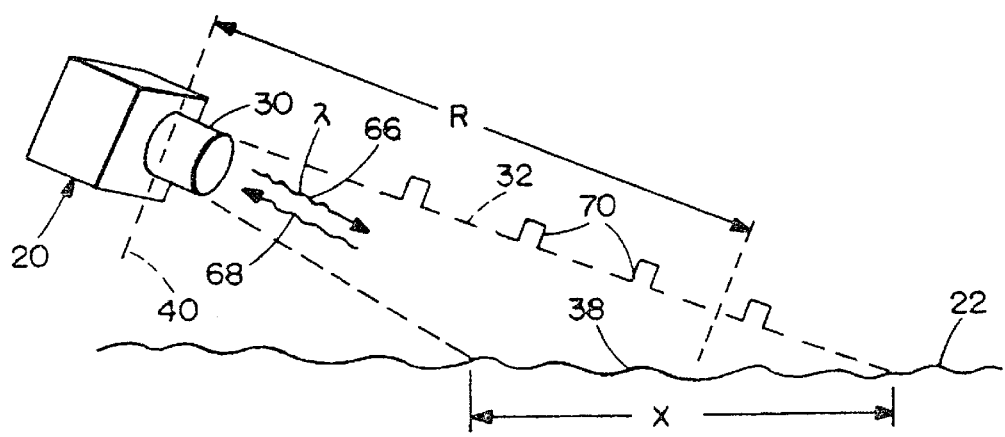
FIG. 5 is a diagrammatic representation of transmitted and received signals propagating between the laser system of FIG. 2 and a target shown a footprint on the earth's surface.

It is convenient to describe the resulting speckle pattern on the image plane 40 in terms of a characteristic dimension, r, which is proportional to the range, R (showed in FIG. 5), of the target, or footprint 38, from the image plane 40 (shown also in FIG. 5). The characteristic dimension, r, is proportional furthermore to the ratio of the wavelength, $\lambda$, of the radiation divided by the width, D (shown in FIG. 5), of the footprint 38. It has been found that the characteristic dimension, r, is essentially equal to the spacing between each of the peaks 46, 52, and 54, this being indicated in the graph of FIG. 3. The speckle pattern can very in time as a result of small changes, comparable to the wavelength of the radiation, in the optical oath length. The small changes in optical path length result from any relative motion between the source of radiation, represented by the system 20, and the target, represented by the footprint 38, as well as from atmospheric fluctuations between successive pulses of radiation transmitted by the system 20.

Figure 4:
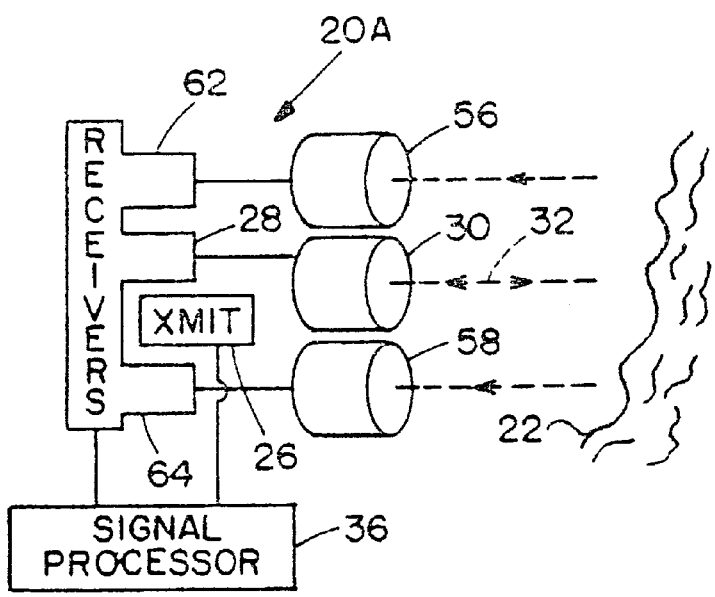
FIG. 4 shows an alternative embodiment of the laser system wherein additional telescopes are employed for observing a received signal.

FIG. 4 shows a further embodiment of the system 20, indicated as system 20A, wherein additional telescopes are employed in conjunction with the telescope 30 in an array 60 to realize the benefit of coherent detection. Two such telescopes 56 and 58 are shown by way of example. The telescope array 60 is constructed by providing each of the telescopes 30, 56 and 58 with an optical aperture having a diameter equal, to the characteristic dimension, r. Fortunately, such a diameter for the telescope apertures permits emplacement of the telescopes 30, 56 and 58 side by side in an array, such as the array 60, as shown in FIG. 4. This enables additional receivers 62 and 64 connected respectively to the telescopes 56 and 58 to operate in joint fashion with the receiver 28 connected to the telescope 30 to observe a single speckle. Any fluctuation in received signal, between successive pulses of illumination of the target, has the same characteristics as received by each or the telescopes 30, 56 and 58. This allows the respective receivers 28, 62 and 64 to operate in the aforementioned joint fashion to provide a significant decrease in signal variance for an improved measurement of spectral characteristics of the received signal.

With reference also to FIG. 3 wherein the trace 44 is shown in one dimension, it is to be understood that the trace 44 of FIG. 3 is symmetrical about the axis 42 in two orthogonal dimensions of the image plane. Accordingly, while the array 60 is shown as a linear array in only one dimension in FIG. 4, the array 60 may be provided as a two dimensional array (not shown) of telescopes positioned symmetrically around the telescope 30 for further improvement in the spectral measurement.

In order to make the measurement of the return signal intensity for accurate representation of the mean value of the return signal energy, it is necessary to average over a number of pulses of the received signal to reduce the variability of signal intensity of the received signal to a desired level. The uncertainty in a given return signal intensity measurement decreases in accordance with the reciprocal of the square of the number of independent measurements.

In accordance with the invention, the averaging can be accomplished by simultaneously viewing a single echo pulse from the target concurrently in a plurality of locations, wherein the locations are spaced apart by the aforementioned characteristic dimension, r, to insure independence of measurement. This can be accomplished also by viewing a succession of received signal pulses wherein the signal of one pulse is independent, in the sense of the signal of one pulse is independent, in the sense of being decorrelated, from each other pulse. Such independence can be attained also in the case of a concurrent viewing of plural spectral lines produced simultaneously within each pulse of a pulse train, the amount of frequency difference between the spectral lines being referred to as a decorrelation frequency. Attainment of the decorrelation frequency will be described with reference to FIGS. 5 and 6.

Figure 6:
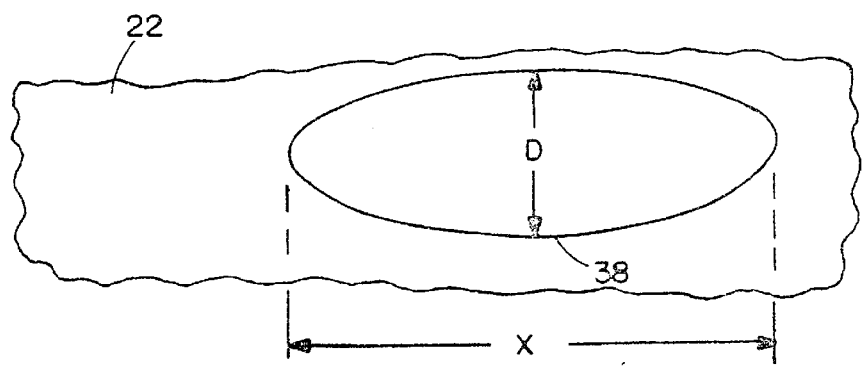
FIG. 6 is a plan view of the footprint of FIG. 5.

FIG. 5 is similar to FIG. 2, and shows the beam 32 being directed downwardly by the telescope 30 of the system 20 toward the ground 22 at a small elevation angle $\theta$ having a value typically in the range of 5–10 degrees, typically 7–8 degrees. The beam illuminates a footprint 38 having a length. x. and a width, D, as shown in FIG. 6. The diameter of the beam, near the earth is in the range typically of 10–15 meters. The length, x, and the width, D, are related mathematically by the equation $x=D/\sin(\theta)$. Transmitted rays are shown at 66 and reflected rays are shown at 68. Pulses 70 of the transmitted radiation have a duration of approximately one nanosecond, which corresponds to a distance of approximately one foot along the footprint 38 as the radiation propagates along the footprint 38.

As noted above, averaging over a succession of pulses can be employed for improved measurement. However, this is time consuming and, hence, disadvantageous. This disadvantage is overcome by the invention by providing that each of the pulses 70 is a composite of numerous spectral lines of light or radiation, wherein each of the numerous concurrent spectral lines differs in frequency from the frequencies of the other lines. The frequencies differ sufficiently, by an amount referred to as the decorrelation frequency, Fd, such that a measurement performed by use of any one of the concurrent spectral lines is independent of a measurement produced any other one of the concurrent spectral lines. Thereby, multiple independent measurements can be accomplished by use of a single one of the pulses 70. This results in a significant reduction in the time required to perform the measurement.

In order to accomplish the foregoing independence of measurement among the concurrent pulses at differing carrier frequencies, the decorrelation frequency, Fd, must be greater than or equal to the ratio $c/(2x)$ wherein c is the speed of light, and x is the aforementioned length of the footprint 38. This relationship may be understood by considering the differential buildup of phase between two sinusoidal components of a pulse as the pulses propagate along the footprint 38. The round trip phase shift, $\theta$, between the signals at 66 and 68 (FIG. 5) is given by $2(\Pi/\lambda)\cos(\theta)$, wherein $\cos(\theta)$ is approximately unity at the low elevation angle, $\theta$, and $\lambda$ is the radiation wavelength. A differential amount of the round trip phase shift, $\theta$, between two signals of different carrier frequency is to be considered. An amount of $\Delta\theta$, equal to $\Pi/2$ in magnitude, provides for a maximum or minimum value of speckle in the image plane 40 (FIGS. 3 and 5). Using this criterion for decorrelation to determine a minimum value for Fd produces the relationship that the magnitude of $\Delta\theta$ is equal to $2 (\Pi/\lambda) (2x) (1/8x)$. [Assuming that the transmitted radiation is infrared radiation with a wavelength, $\lambda$, equal to $10^{-5}$ meters, and that the length, x, of the footprint 38 is 25 meters, Fd must be equal to or greater than 1.5 MHz (megahertz). While the foregoing values of wavelength and footprint length are provided by way of example, these values are employed in the preferred embodiment of the invention.

In the foregoing embodiment of the invention, and assuming that there are N such spectral lines within a single one of the pulses 70, then there are N independent measurements, or speckle realizations, which reduce the variance of the reflected signal for a single pulse 70 by the square root of N. By way of alternative embodiments in the practice of the invention, instead of providing N concurrent pulses of differing carrier frequencies, there may be provided a single pulse wherein the carrier frequency is swept over a frequency range equal to N (Fd) This also enables the N independent measurements, or speckle realizations, which reduce the variance of the reflected signal for a single pulse 70 by the square root of N.

By use of a mode-locked laser in the laser system 20, as will be described in FIG. 8, the laser can produce concurrently a plurality of carrier frequencies in the nature of a line spectrum with equal spacing in frequency, or mode spacing, between the end mirrors by a relationship, namely, that the mode spacing is equal to $c/(2L)$. Herein, c is the speed of light in the laser. Within the region of operation of the laser wherein there is sufficient gain to produce oscillation, there is sufficient bandwidth to generate numerous spectral lines with the foregoing mode spacing. Such a spacing of concurrently generated spectral lines for a mode-locked laser is shown in simplified fashion in FIG. 7.

A modulator within the laser resonator, to be described in greater detail with reference to FIG, 8, is operated to produce mode-locking pulses having the pulse duration of one nanosecond, this resulting in the generation of the pulses 70 with the plural spectral lines described above in reference to FIG. 5. While other durations of the pulses 70 may be employed, the duration of one nanosecond is employed in the preferred embodiment of the invention. The bandwidth of the frequency spectrum of the one nanosecond pulse is 1000 MHz in the case of a single pulse, the spectrum is continuous. However, upon generating a repetitive train of the pulses, the spectrum becomes a line spacing proportional to the reciprocal of the time interval between pulses. Thus, a higher repetition frequency of the pulses of the pulse train results in a larger frequency difference between the lines or the spectrum. The length, L, of the resonator is selected to produce a mode spacing of 25 MHz. By operating the modulator at a frequency commensurate with the mode spacing, a modulator frequency of 12.5 MHz being employed for reasons to be explained hereinafter. The modulator allows passage of reflected radiant energy for each round trip of reflection between end mirrors of the laser for the mode locking. Pulses are outputted at a 25 MHz rate. Thus, the laser produces a line spectrum of 40 lines spaced apart from each other by 25 MHz. Thereby, the laser enables the concurrent measurement of N independent measurements with N=40.

Figure 7:
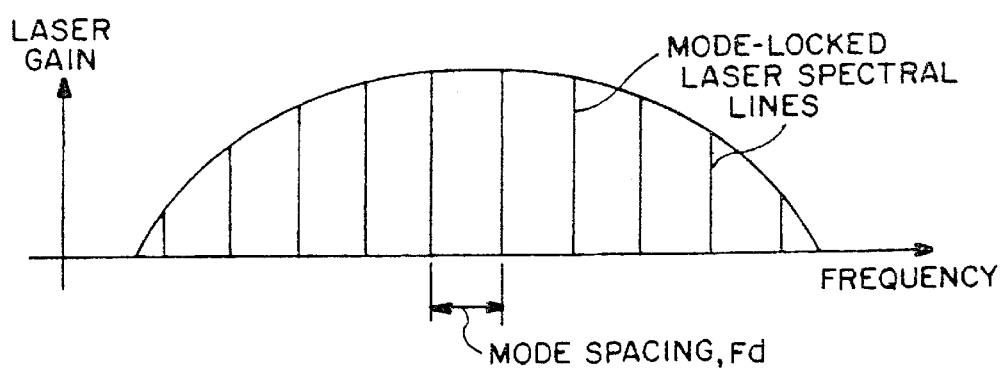
FIG. 7 shows a line spectrum of a mode-locked laser.
Figure 8:
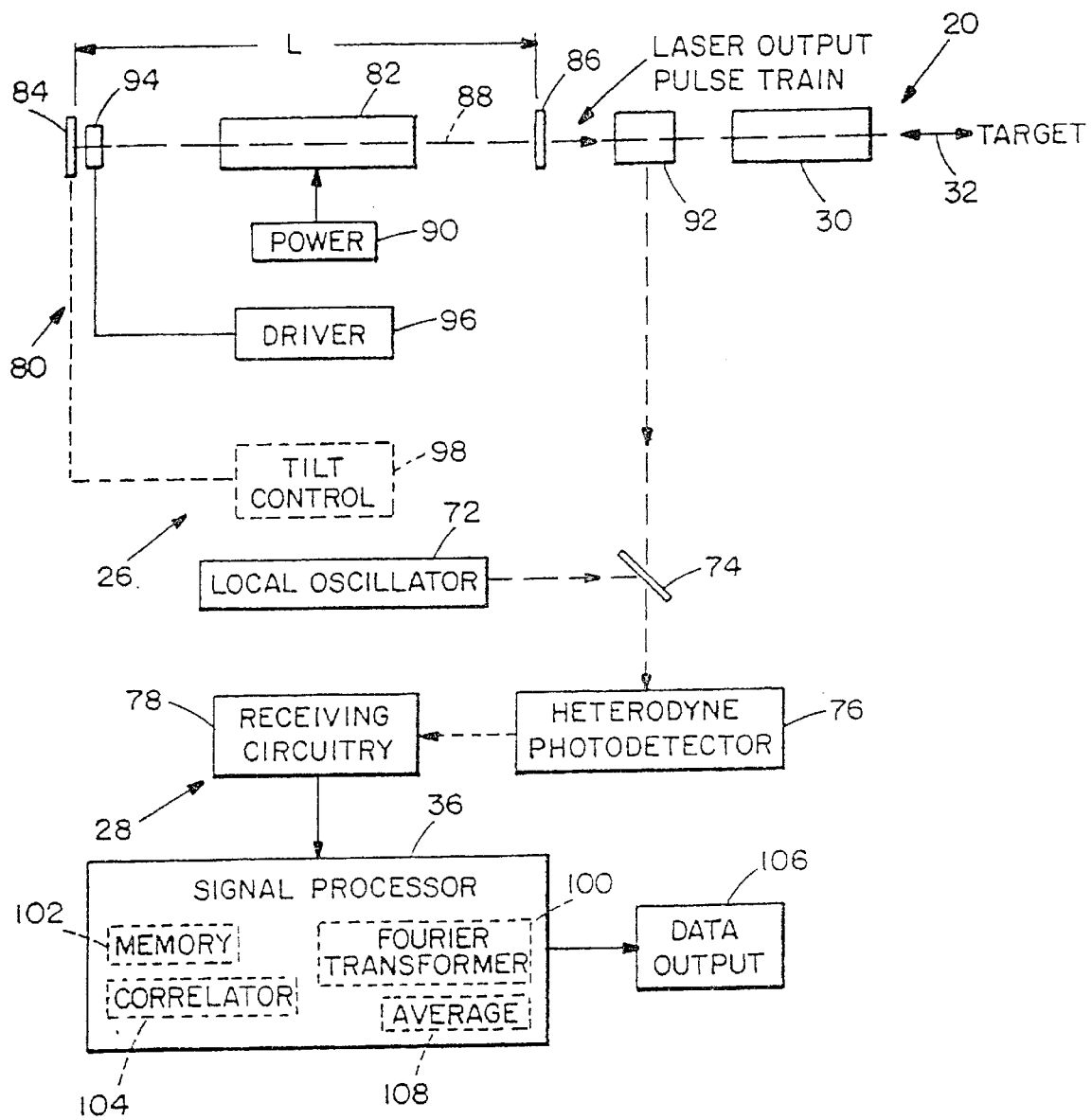
FIG. 8 is a diagrammatic representation of the laser system of either FIGS. 1 or 2.

FIG. 8 shows details in the construction of the laser system 20, previously discussed with reference to FIGS. 1 and 2 including the telescope 30 and the signal processor 36 and their interconnections with the transmitter 26 and the receiver 28. The receiver 28 is a heterodyne type of receiver and comprises a local oscillator 72, a semi-reflecting mirror 74, a heterodyne detector 76 and receiving circuitry 78. The transmitter 26 comprises a laser 80 having a lasing medium 82 disposed between two end mirrors 84 and 86. A beam 88 of infrared radiation is developed within the medium 82 in response to energization of the medium 82 by a source 90 of input power, and is reflected between the mirrors 84 and 86 to build up in intensity. The mirror 86 is partially transparent to allow a portion of the beam energy to exit the laser 80 and propagate via a transmit/receive switch 92 to the telescope 30 to exit the system 20 as the beam 32. The beam 32 illuminates a target in the form of the aircraft 24 (FIG. 1) or the ground 22 (FIG. 2). In order to provide the line spectrum of FIG. 7, the laser 80 includes a modulator 94 driven by a driver 96 for mode-locking the laser 80.

Figure 9:
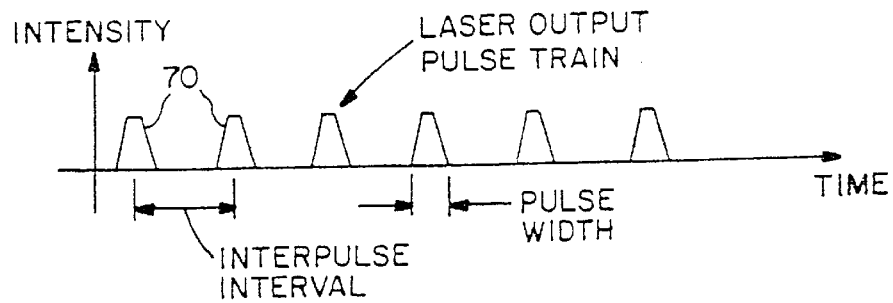
FIG. 9 is a graph presenting a stylized representation of a pulse train outputted by a laser.

As described hereinabove, the mode-locking results in the outputting from the laser 80 of a train of pulses 70, as is depicted in FIG. 9, wherein each of the pulses 70 is a composite of numerous mode-locked spectral lines within each of the pulses 70. In the preferred embodiment of the invention, the pulses 70 each have a width of one nanosecond with interpulse spacing of 40 nanoseconds, as described hereinabove. Also, the laser 80 employs a carbon dioxide lasing medium 82 providing a wavelength of approximately 11 microns. The pulse train extends over an interval of time of approximately 3–5 microseconds.

The modulator 94 may be constructed as a Bragg cell of piezoelectric material wherein the driver 96 energizes an acoustic wave within the piezoelectric material. The wave gives the appearance of a grating to the cell with peak values, whether positive or negative, serve to compress the piezoelectric material to form the grating. Thus, the spatial frequency of the grating is double the excitation frequency of the driver 96. Accordingly, to produce the mode spacing of 25 MHz, the driver 96 outputs a driver signal at half the foregoing frequency, namely, 12.5 MHz. The grating of the Bragg cell tends to deflect the laser beam away from the longitudinal axis of the laser, this resulting in a termination of a laser pulse and serving to control the length and time of occurrence of each pulse of light outputted by the laser 80.

If desired, the laser 80 can be operated in accordance with an alternative embodiment of the invention wherein, instead of producing the line spectrum, the laser 80 is modified by replacing the mirror 84 with a grating, such that by tilting the grating, the frequency of radiation outputted by the laser 80 is swept in frequency over an interval of time. For example, the tilting can be accomplished by a controller 98, indicated in phantom view, which rotates the grating about an axis perpendicular to a longitudinal axis of the laser 80 at a fixed rate of rotation during an interval of time such as the duration of a pulse 70 outputted by the laser 80. This sweeps the carrier frequency of the beam 98 linearly during the duration of a pulse 70.

In operation, during reception of an echo reflected from the target, the switch 92 is operated to direct received light through the mirror 74 to the detector 76. The local oscillator 72, which may also be a laser operating continuously for outputting a single frequency, directs a reference signal via the mirror 74 to the detector 76. The frequency of the local oscillator 72 is offset from the carrier frequency of the laser 80 so as to output from the detector 76 a base band signal to the circuitry 78. The base band signal is filtered, amplified and converted from analog to digital format in the circuitry 78, and is then outputted as a digital signal to the signal processor 36. The signal processor 36 includes a Fourier transformer 100, a memory 102 and a correlator 104. Prior to conduction of the spectral measurements, a sample the laser signal is drawn via the switch 92 and applied to the detector 76. The detected sample signal is applied to the Fourier transformer 100 to provide a reference spectrum which is stored in the memory 102. The Fourier transformation is conducted digitally with sample points at each frequency of the line spectrum of the transmitted signal. In the case of the alternative embodiment of the invention employing the swept frequency, the sweeping of the frequency extends across the same spectral band as is present in the case of the embodiment utilizing the pulse train without the sweeping of the frequency. Also, in the swept-frequency embodiment, the digitally sampled points in the frequency spectrum for the Fourier transformation include at least sampling points spaced apart in the frequency spectrum by the decorrelation frequency Fd. Subsequently, during conduction of the spectral measurements, the Fourier transforms of the received signals are correlated against the reference spectrum stored in the memory 102. The results of the correlation are applied to a data output unit 106 which may be a printer, or display or storage, by way of example, serving to present the output data to persons using the system 20.

The foregoing processing of the received signal can also be accomplished for the system 20A of FIG. 4, in which case data is outputted by the correlator 102 for each of the telescopes 30, 56 and 58, and is then averaged by an averaging unit 108 prior to outputting to the data output unit. In the case of the swept frequency embodiment of the invention, sampling of frequencies by the Fourier transformer takes place over the same spectral band as in the case of the processing of the comb spectrum. Therefore, the spectral data can be obtained by the signal processor 36 in both embodiments of the invention. This applies whether there is a single telescope 30, as in FIG. 2, or multiple telescopes 30, 56 and 58 as in FIG. 4.

Figure 10A:
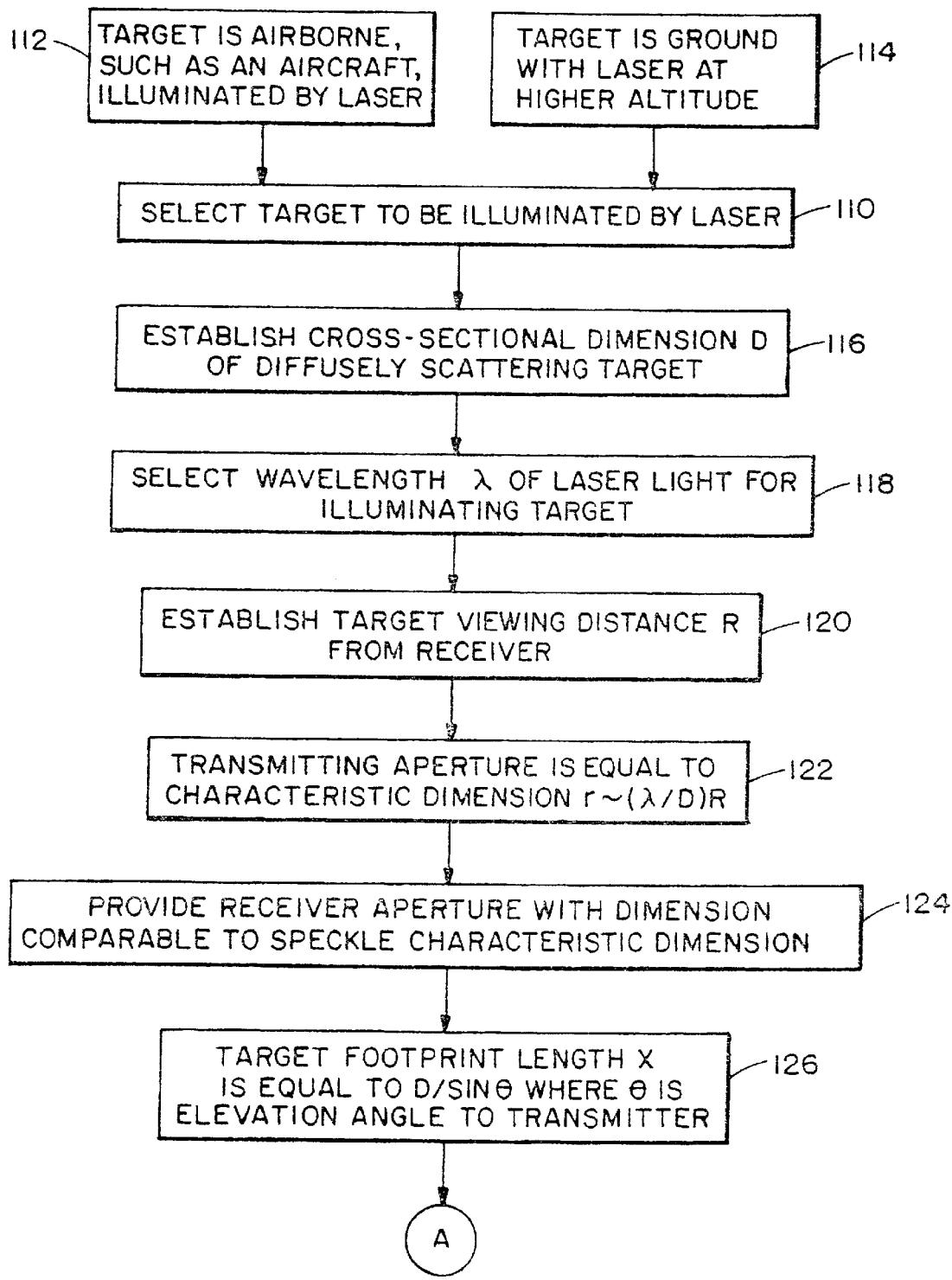
FIGS. 10A and 10B, taken together, constitute a flow chart of the process or the invention.
Figure 10B:
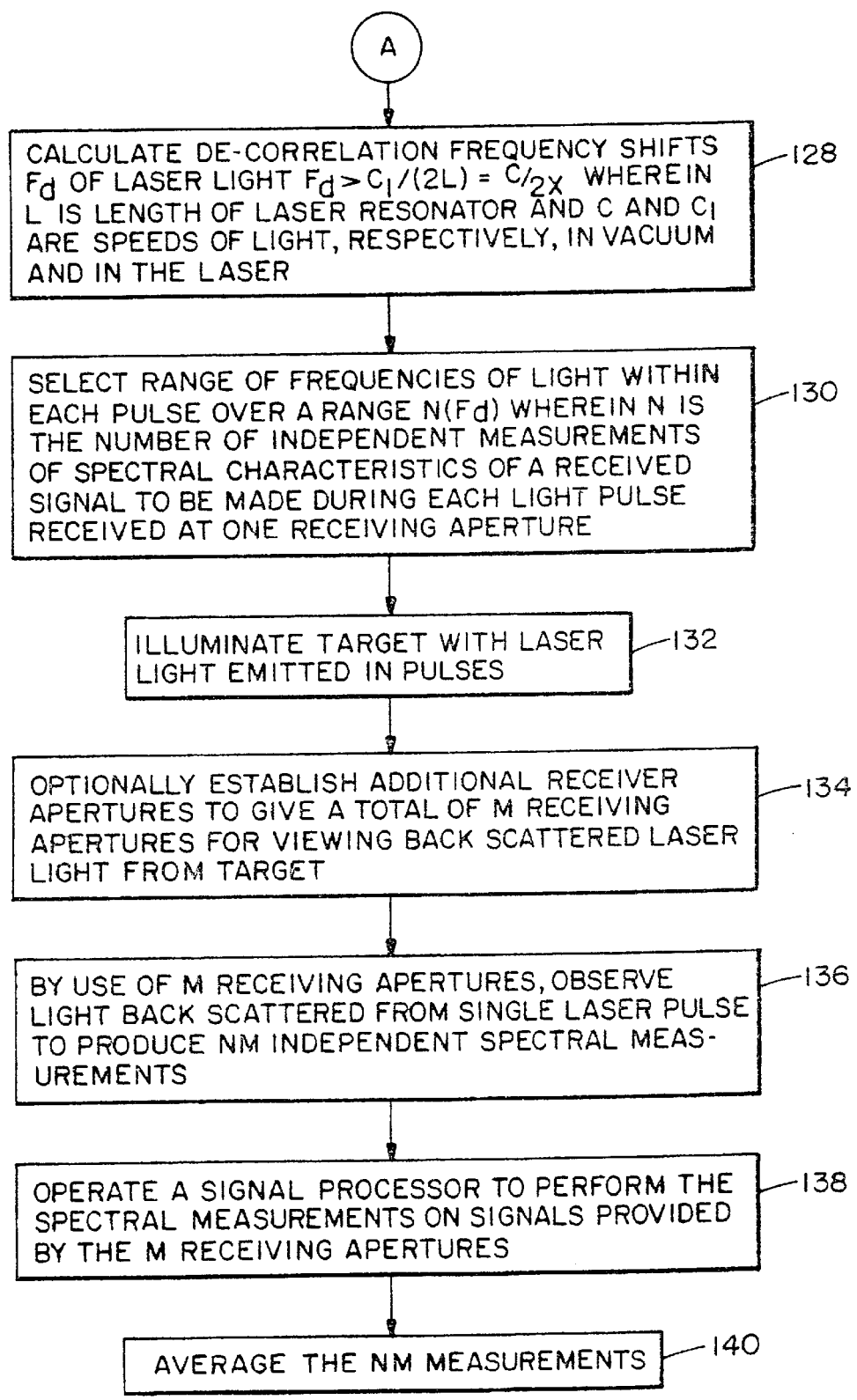

The methodology in the practice of the invention is set forth in the flow chart of FIGS. 10A–10B. The procedure begins at block 110 wherein a selection is made as to the type of target to be illuminated by the laser. Thus, with reference to block 112, the target may be an airborne target wherein the target is to be illuminated by the laser system positioned on the ground, as shown in FIG. 1. Alternatively, as set forth in block 114, the target may be on the ground, as shown in FIG. 2, wherein the laser system is carried at higher altitude, as by an aircraft. After the selection of target in block 110, the procedure continues with block 116 wherein there is establishment of the cross-sectional dimension D of the footprint of the illumination region upon a diffusely scattering target. Then, at block 118 there is a selection of a wavelength of the laser light to be employed in illuminating the target. The procedure continues at block 120 wherein the target viewing distance R between the target and the receiver of the laser system is established.

The foregoing information is employed at block 122 to determine a characteristic dimension r of the speckle in the image plane of the receiver for configurations of the invention employing a monostatic or bistatic radar for the viewing of radiation reflected from the target. The characteristic dimension, r, is given in terms of the wavelength of the illuminating light, the cross-sectional dimension of the illumination footprint and the range between the target and the image plane of the receiving equipment, whether the radar be in a monostatic configuration, as is shown in FIGS. 1 and 2, or in a bistatic configuration (not shown). The characteristic dimension, r, established in block 122 is employed to construct a cross-sectional dimension of a viewing telescope so as to maximize the signal reception of a speckle. In the case of the monostatic radar configuration disclosed in the preferred embodiment of the invention, the optimum telescope receiving aperture is equal to the transmission aperture of the telescope. At block 126, it is noted that the target footprint x is equal to the ratio of the characteristic dimension and the sine of the elevation angle of the beam from target to transmitter. The procedure then advances from block 126 via terminal A to block 128 on FIG. 10B.

In block 128 of FIG. 10B, there is a calculation of decorrelation frequency shift, Fd, of the illuminating laser light in terms of the speed of light, c, and the length, L, of the laser resonator. Fd is to become the spacing of spectral lines of a pulsed mode-locked laser producing a train of light pulses. The procedure advances to block 130 wherein there is a selection of a range of frequencies of light within each light pulse, the range encompassing a frequency band having a number, N, of intervals along the frequency axis of Fd. These intervals are the mode spacing between the spectral lines as shown in FIG. 7. Since the mode spacing is equal to the decorrelation frequency, the frequency band permits transmission of a total of N spectral components within the pulse train for concurrently attaining N independent measurements of the spectral characteristics to be made during each light pulse received at the receiving equipment.

Thereafter, at block 132, the target is illuminated with the pulse train of laser light. There is synchronization of the individual spectral lines of the pulses of the pulse train attained by operating the laser in a mode-locked manner. In the absence of such mode locking, the individual sinusoidal components of the waveform at the various spectral lines may drift relative to each other, this interfering with the precision of the measurements. By way of optional embodiment in the practice of the invention, at block 134 there may be established additional receiving apertures to give a total of M receiving apertures for viewing back scattered laser light from the target as shown in FIG. 4. Also, by way of alternative embodiment in the practice of the invention, the carrier frequency may be swept linearly during a pulse of transmitted radiation wherein the bandwidth of the signal transmission is the same as the bandwidth set forth above in block 130. Use of the plural receiving apertures, as disclosed in block 136, provides for observation of back scattered light to produce additional independent measurements is given by the product of NM. The independent spectral measurements are accomplished, at block 138, by operation of a signal processor employing the transformation, storage of a reference spectrum, and correlation (shown in FIG. 8) of signals received by each of the receiving apertures. Thereupon, at block 140, there is an averaging of the measurements produced from each of the receiving apertures, the averaging being disclosed in FIG. 8.

It is to be understood that the above described embodiments of the invention are illustrative only, and that modifications therefore may occur those skilled in the art. Accordingly, this invention is not to be regarded as limited to the embodiments disclosed herein, but is to be limited only as defined by the appended claims.

What is claimed is:

1. A method of performing multiple concurrent independent spectral measurements for mitigating the effect of speckle in a system employing coherent radiation, comprising steps of:

operating a laser in mode-locked fashion to produce a signal comprising a train of pulses of radiation characterized in the frequency domain by a line spectrum wherein the lines are sufficiently spaced apart in frequency to ensure decorrelation of respective ones of the frequency components of the pulse-train signal;

directing a beam of light from the laser to a target for illumination of the target, the beam of light having the pulse train signal, the beam of light illuminating a region of the target in the form of a footprint;

determining the dimension of length of the footprint and the magnitude of the decorrelation frequency, wherein the decorrelation frequency is inversely proportional to the length of the footprint;

performing a Fourier transform on a signal reflected from the target to provide a received signal spectrum; and comparing the received signal spectrum with a reference spectrum of the signal transmitted from the laser to obtain data from independent spectral measurements.

2. A method according to claim 1 further comprising steps of:

determining a dimension of width of the footprint;

establishing a characteristic dimension of speckle in an image plane at a location of reception of light reflected from the target, the characteristic dimension being proportional to a wavelength of the radiation and to a distance between the target and the location of reception, the characteristic dimension being inversely proportional to the width of the footprint; and providing a plurality of receiving telescopes located in an array at the image plane wherein points of location of the telescopes are separated by the characteristic dimension.

3. A method according to claim 2 further comprising steps of:

performing Fourier transformations on signals received by respective ones of said plurality of receiving telescopes; and averaging spectral measurements produced by the Fourier transformation of said signals received at said plurality of telescopes.

4. A method of performing multiple concurrent independent spectral measurements for mitigating the effect of speckle in a system employing coherent radiation, comprising steps of:

operating a laser by sweeping the frequency of a signal outputted by the laser;

directing a beam of light from the laser to the target for illumination of the target, the beam of light having the pulse train signal, the beam of light illuminating a region of the target in the form of a footprint;

determining the dimension of length of the footprint and the magnitude of the decorrelation frequency, wherein the decorrelation frequency is inversely proportional to the length of the footprint;

performing a Fourier transform on a signal reflected from the target to provide a received signal spectrum, said Fourier transformation being accomplished digitally with samples of frequency being taken across the frequency band of the signal transmitted by the laser, wherein sampling points in the frequency domain include at least spectral lines spaced apart by the decorrelation frequency; and comparing the received signal spectrum with a reference spectrum of the signal transmitted from the laser to obtain data from independent spectral measurements.

5. A method according to claim 4 further comprising steps of:

determining a dimension of width of the footprint;

establishing a characteristic dimension of speckle in an image plane at a location of reception of light reflected from the target, the characteristic dimension being proportional to a wavelength of the light and to a distance between the target and the location of reception, the characteristic dimension being inversely proportional to the width of the footprint; and providing a plurality of receiving telescopes located in an array at the image plane wherein points of location of the telescopes are separated by the characteristic dimension.

6. A method according to claim 3 further comprising steps of:

performing Fourier transformations on signals received by respective ones of said plurality of telescopes; and averaging spectral measurements produced by the Fourier transformation of said signals received at said plurality of telescopes.

\* \* \* \* \*